United States Patent [19]
Nickell

[11] 3,870,503
[45] Mar. 11, 1975

[54] RIPENING OF SUGARCANE BY USE OF N-VALERIC ACID

[75] Inventor: Louis G. Nickell, Honolulu, Hawaii

[73] Assignee: Hawaiian Sugar Planters Association, Honolulu, Hawaii

[22] Filed: Oct. 3, 1973

[21] Appl. No.: 403,019

[52] U.S. Cl.......................... 71/106, 71/113, 71/115
[51] Int. Cl............................................... A01n 9/24
[58] Field of Search....................... 71/106, 113, 76

[56] References Cited
UNITED STATES PATENTS

| | | | |
|---|---|---|---|
| 2,765,224 | 10/1956 | Lambrech | 71/106 |
| 2,852,555 | 9/1958 | Pumpelly | 71/94 |
| 3,001,862 | 9/1961 | Sowa | 71/113 |
| 3,080,405 | 3/1963 | Larsen et al. | 71/106 |
| 3,245,775 | 4/1966 | Pfeiffer | 71/113 |
| 3,482,959 | 12/1969 | Nickell et al. | 71/88 |
| 3,499,750 | 3/1970 | Barnsley et al. | 71/113 |
| 3,619,165 | 11/1971 | Covey et al. | 71/106 |
| 3,767,377 | 10/1973 | Poulos | 71/07 |

OTHER PUBLICATIONS

Alexander et al., "Chemical Association of Sugarcane," (1971), CA 75, No. 130980d., (1971).

*Primary Examiner*—Glennon H. Hollrah
*Attorney, Agent, or Firm*—Burns, Doane, Swecker & Mathis

[57] ABSTRACT

Sucrose yield of sugarcane is increased by treating sugarcane a few weeks prior to harvest with a sugarcane ripening agent selected from the group consisting of n-valeric (pentanoic) acid, and alkali metal salts or ethyl esters of an aliphatic monoacid having from 1 to 5 carbon atoms.

10 Claims, No Drawings

RIPENING OF SUGARCANE BY USE OF N-VALERIC ACID

BACKGROUND OF THE INVENTION

Considerable progress has been made in the last several years in increasing the sugar yield of sugarcane by improving the varieties being planted, enriching the soil with fertilizers and irrigating the soil in climates which do not naturally provide sufficient moisture for optimum plant growth. More recent efforts in improving sugar production have increasingly turned toward the use of chemicals in modifying the controlling of the physiological processes of sugarcane, particularly in ripening prior to harvest. See U.S. Pat. Nos. 3,244,865; 3,245,775; 3,291,592; 3,482,959; 3,482,961; 3,493,361; 3,505,056; 3,660,072 and 3,671,219.

With some compounds previously suggested for this purpose, there has been some concern about their resistance to breakdown in the plant and their persistence in the soil when the intended use of the sugar is nutritive as opposed to industrial (e.g., in fermentation processes). Consequently, extensive efforts continue to be made in searching for effective chemical agents that can be used to modify the ripening of sugarcane so as to increase the sucrose yield therefrom.

Generally speaking, chemicals selected for evaluation have been of types which have been previously found active in work with other plants as plant hormones, herbicides or inhibitors of growth of terminal buds, or active in killing the spindle of cane upon topical micro-application, etc. However, among the compounds heretofore found to be useful for such other special purposes, surprisingly few have been found effective in controlling the ripening of surgarcane in the desirable manner. No predictable relationship has been recognized to date between (a) the chemical structure of such compounds, (b) their phytotoxic effects, or (c) their physiological effects on the morphogenetic development of the plant, and their activity in having positive effects on ripening. In other words, the effectiveness of a compound in controlling the ripening of sugarcane and thereby increasing sugar yield remains essentially unpredictable, and the search for suitable agents continues to be fundamentally empirical.

OBJECTS OF THE INVENTION

It is an object of this invention to provide new agents for controlling the ripening of sugarcane. A more specific object is to increase the sucrose yield of sugarcane by chemically treating it during its final ripening stages prior to harvest without introducing substantial toxicological hazards, and preferably without causing any visible damage to the cane plant such as drying of the spindle or other leaf.

Still more specifically, it is an object to increase the sucrose yield of sugarcane by treating it prior to harvest with a chemical agent which is sufficiently stable to provide the desired effect over a period of several weeks and thus give adequate operational flexibility, but which has a relatively low degree of persistence and is susceptible to autodecomposition or decomposition by soil bacteria. Compounds which increase the sucrose content of sugarcane only temporarily over a period of two or three weeks after application and then result in a substantial decrease are generally not desirable for the intended purpose.

SUMMARY OF THE INVENTION

It has now been discovered that excellent results in increasing the sucrose yield of sugarcane can be obtained by applying a sugarcane ripening agent taken from the group consisting of n-valeric acid and the alkali metal salts and ethyl esters of an aliphatic monoacid having 1 to 5 carbon atoms to the cane at a time at least about two weeks and up to about ten weeks before harvest.

DESCRIPTION OF SPECIFIC EMBODIMENTS

The n-valeric (pentanoic) acid and the ethyl ester of an aliphatic monoacid having 1 to 5 carbon atoms utilized in the process of the present invention are liquids while the alkali metal salts of an aliphatic monoacid having 1 to 5 carbon atoms are crystalline, water-soluble solids under normal ambient conditions. These sugarcane ripening agents are generally applied to the sugarcane in an aqueous medium.

Good results are obtained when the sugarcane crop is treated at a rate in the range of from about 1 to about 40 pounds of the active ingredient per acre of sugarcane, though higher rates of up to about 80 pounds or more per acre as well as rates lower than 1 pound per acre can be used. The optimum amount will vary somewhat depending on the specific treating composition applied.

In accordance with this invention, the sugarcane crop is treated with the sugarcane ripening agent at any time from 2 to 10 weeks before harvest, the preferred time for treatment being between about 3 and 8 weeks prior to harvest.

The sugarcane ripening agent is conveniently applied to the field in the form of an aqueous solution or suspension, e.g., a liquid composition which may be sprayed from a boom-spray or a solid dust composition where the active compound is diluted with an inert solid such as clay and which can be applied as a dust from an airplane.

With the type of boom-spray apparatus used in this work, it has been found convenient to apply the active ingredient to the sugarcane field in the form of an aqueous solution, suspension or emulsion having a concentration of active agent such that the application at a rate of from 5 to 20 gallons of liquid composition per acre will provide the required dosage of active chemical. However, the use of lower or higher gallonages may be preferred when a different dispensing mechanism is used.

Water is the preferred liquid carrier for the active sugarcane ripening agents in practicing the present invention. Instead of using water as the carrier, non-phytotoxic mineral oils either as such or in the form of water-in-oil or oil-in-water emulsions may be used similarly in accordance with practices which are common in the art of treating vegetation with beneficial growth control agents. Other active ingredients are not required and are preferably omitted with the n-valeric acid, alkali metal salt or ethyl ester of an aliphatic monoacid having 1 to 5 carbon atoms being present as essentially the sole active ingredient in the solution or suspension.

While n-valeric acid exhibits substantial sugarcane ripening activity it has been found that most other homologous aliphatic monoacids are unsuitable for use as sugarcane ripening agents. That is, aliphatic monoacids having 6 or more carbon atoms do not show sufficient activity (or show no activity) as sugarcane ripening agents and are practically insoluble in water, while aliphatic monoacids having 4 or less carbon atoms either show less sugarcane ripening activity than n-valeric acid or possess other properties which prevent them from being considered as commercially acceptable ripening agents. For example, formic acid (methanoic acid) is a volatile liquid, giving off disagreeably pungent fumes and producing superficial blisters on contact with the skin. Pure formic acid is an active caustic. Diluted, it is locally an irritant and an astringent. Both formic and acetic acids are given severe toxicity ratings, both acute local and acute systemic (ingestion, irritant and inhalation). Intravenous injection into mice of a group of fatty acids shows the 5-, 6-, and 7-carbon acids to be the least toxic. The increase in toxicity for 4 and below and 8 and above appears quite sharp. In other words, both from the actual physical handling, as well as the inherent toxicity, formic and acetic acids are not desirable. Propionic acid shows variable activity and inconsistent results as a sugarcane ripening agent. n-Butyric acid shows less activity than n-valeric acid and has an even worse smell.

It has been found, however, that the alkali metal (i.e., the metals of Group IA of the Periodic Table) salts and the ethyl esters of the aliphatic monoacids having 1 to 5 carbon atoms also possess sugarcane ripening activity. These said salts and esters do not possess the adverse properties (such as toxicity, irritability and the like) which the corresponding acids possess and are therefore acceptable sugarcane ripening agents for use in the process of the present invention. Sodium is the preferred alkali metal. Mixtures of these sugarcane ripening agents may also be utilized.

The invention is additionally illustrated in connection with the following Examples which are to be considered as illustrative of the present invention. It should be understood, however, that the invention is not limited to the specific details of the Examples.

EXAMPLE I n-Valeric acid is deposited or dropped by means of a syringe with a fine needle on the spindle area at the top of the last visible dewlap of each 20 stalks of sugarcane aged 24.7 months. (A dewlap is the junction between the blade of the leaf and the leaf sheath which clasps the stalk.) The salks are contacted with about 0.3 ml. deposits of the n-valeric acid sugarcane ripening agent which corresponds to an application rate of about 30 pounds of the agent per acre of sugarcane. Ten of the stalks are harvested 4 weeks after such treatment and 10 more are harvested 5 weeks after such treatment. A similar treatment is made of each of 20 of the same sugarcane stalks with a 0.6 ml. dispersion of a solution containing Trysben, a known sugarcane ripening agent, which is the dimethylamine salt of 2, 3, 6-trichlorobenzoic acid. The Trysben is applied in the form of a 50 percent aqueous solution containing about 0.25 percent (w/w) nonylphenol which is ethoxylated to contain about 10.5 moles of ethylene oxide per mole of nonylphenol.

The top 15 joints of the treated cane as well as those of similar untreated cane are removed, combined and analyzed in terms of juice purity and pol percent cane, following the so-called "press method" developed by T. Tanimoto, Hawaiian Planters Record, 57, 133 (1964). "Pol percent cane" is a polarimetric determination and equals the percentage of sucrose if the latter is the only substance in the solution which will rotate the plane of polarized light. In any event, determination of the pol percent cane is a standard and effective method for determining the sucrose content of sugarcane.

The results are given below:

|  | Time From Treatment To Harvest | | | |
|---|---|---|---|---|
|  | Four Weeks | | Five Weeks | |
|  | Juice Purity | Pol Percent Cane | Juice Purity | Pol Percent Cane |
| Control (untreated) | 74.51 | 8.91 | 77.73 | 9.74 |
| Standard (Trysben) | 75.45 | 8.91 | 81.56 | 11.52 |
| n-Valeric Acid | 82.84 | 11.28 | 85.24 | 12.61 |

As is apparent, the application of the n-valeric acid results in a very substantial improvement in both juice purity and pol percent cane.

EXAMPLE II

The procedure of Example I is repeated on stalks 17.3 months of age in a different field with both 0.15 ml/stalk (about 15 pounds/acre) and 0.3 ml/stalk deposits (about 30 pounds/acre) of n-valeric acid. The following results are obtained.

|  | Time From Treatment To Harvest | | | |
|---|---|---|---|---|
|  | Four Weeks | | Five Weeks | |
|  | Juice Purity | Pol Percent Cane | Juice Purity | Pol Percent Cane |
| Control (untreated) | 77.3 | 9.7 | 79.1 | 10.6 |
| Standard (Trysben) | 75.3 | 9.7 | 80.6 | 11.4 |
| n-Valeric Acid (0.3 ml/stalk) | 82.2 | 10.4 | 81.6 | 11.7 |
| n-Valeric Acid (0.15 ml/stalk) | 81.9 | 11.3 | 84.7 | 12.8 |

A very apparent improvement in sucrose yield and juice purity results.

EXAMPLE III

Example I is repeated on stalks 20.3 months of age from the field of Example II with 0.3 ml/stalk deposits (about 30 pounds/acre) of n-valeric acid with the following results.

|  | Time From Treatment To Harvest | | | |
|---|---|---|---|---|
|  | Four Weeks | | Five Weeks | |
|  | Juice Purity | Pol Percent Cane | Juice Purity | Pol Percent Cane |
| Control (untreated) | 77.17 | 8.93 | 79.95 | 10.35 |
| Standard (Trysben) | 76.05 | 8.86 | 82.80 | 12.27 |
| n-Valeric Acid | 80.00 | 10.17 | 80.94 | 10.86 |

Again, the improvement in sucrose yield and juice purity is apparent.

EXAMPLE IV

The procedure of Example I is repeated utilizing the sodium salts of formic, acetic, propionic, n-butyric, isobutyric, n-valeric and isovaleric acids on stalks 20 months of age in amounts of 0.3 ml/stalk deposits (about 30 pounds/acre). Each of these salts results in a substantial improvement in both juice purity and pol percent cane as compared with the untreated control.

EXAMPLE V n-Valeric acid, heptanoic acid, caprylic acid and nonanoic acid are applied to stalks 18.3 months of age in amounts of 0.3 ml/stalk (about 30 pounds/acre) following the general procedure of Example I except that all of the stalks are harvested 4 weeks after such treatment. The results obtained are as follows:

|  | From Treatment To Harvest Four Weeks | |
| --- | --- | --- |
|  | Juice Purity | Pol Percent Cane |
| Control (untreated) | 62.67 | 7.16 |
| Pentanoic (n-Valeric) | 72.52 | 7.90 |
| Heptanoic | 61.64 | 6.08 |
| Octanoic (Caprylic) | 57.31 | 5.59 |
| Nonanoic (Pelargonic) | 61.02 | 6.22 |

The results show that the carboxylic acids in this test other than n-valeric acid actually decrease the yield and purity of sugar.

EXAMPLE VI

The procedure of Example I is repeated on stalks 21.5 months old using 0.3 ml/stalk deposits of n-valeric, formic, acetic and n-butyric acids. A similar treatment is again made with Trysben for comparison purposes. Hendecanoic acid is applied at a rate of 38 mg/stalk (which corresponds to 4 pounds/acre). The following results are obtained:

|  | Time From Treatment To Harvest | | | |
| --- | --- | --- | --- | --- |
|  | Four Weeks | | Five Weeks | |
|  | Juice Purity | Pol Percent Cane | Juice Purity | Pol Percent Cane |
| Control (untreated) | 78.36 | 10.88 | 73.50 | 8.86 |
| Standard (Trysben) | 84.47 | 11.66 | 83.17 | 10.77 |
| Methanoic (Formic) | 72.93 | 8.96 | 81.42 | 11.24 |
| Ethanoic (Acetic) | 79.62 | 10.80 | 75.19 | 8.96 |
| Butanoic (n-Butyric) | 77.03 | 9.87 | 74.46 | 8.58 |
| Pentanoic (n-Valeric) | 83.13 | 12.45 | 84.11 | 12.33 |
| Undecanoic (Hendecanoic) | 68.62 | 7.29 | 67.49 | 6.99 |

The improved results are apparent.

EXAMPLE VII

Example I is repeated on stalks 20 months using 0.3 ml/stalk deposits of formic, n-butyric, n-valeric, and isovaleric acids and Trysben. The following results are obtained:

|  | Time From Treatment To Harvest | | | |
| --- | --- | --- | --- | --- |
|  | Four Weeks | | Five Weeks | |
|  | Juice Purity | Pol Percent Cane | Juice Purity | Pol Percent Cane |
| Methanoic (Formic) | 83.29 | 10.89 | 82.77 | 12.01 |
| Butanoic (n-Butyric) | 75.97 | 10.48 | 80.60 | 11.24 |
| Pentanoic (n-Valeric) | 79.70 | 10.23 | 86.02 | 13.12 |
| 3-methyl-butanoic (isovaleric) | 77.04 | 9.15 | 74.37 | 8.41 |
| Trysben (Standard) | 79.96 | 10.05 | 74.13 | 8.67 |
| Control (untreated) | 75.51 | 9.00 | 77.56 | 9.40 |

EXAMPLE VIII

Example I is repeated on stalks 19 months of age using the ethyl esters of acetic, n-valeric and isovaleric acids in amounts of 0.3 ml/stalk deposits (about 30 pounds/acre). The results show an improvement in sucrose yield and purity for the stalks treated with each of these compounds as compared with the untreated control samples.

EXAMPLE IX n-Valeric acid is applied to field grown cane at a rate of 4 pounds/acre by a boom-spray. Samples are taken just prior to application and at weekly intervals from 3 to 8 weeks after application. These samples are tested for juice purity and pol percent cane using the procedure of Example I. The following results are obtained:

|  | Juice Purity | | Pol Percent Cane | |
| --- | --- | --- | --- | --- |
| Weeks | Control | 4 lb/acre | Control | 4 lb/acre |
| 0 | 72.7 | 72.7 | 8.7 | 8.7 |
| 3 | 76.5 | 81.1 | 8.8 | 10.7 |
| 4 | 73.8 | 86.0 | 8.2 | 11.3 |
| 5 | 77.5 | 78.4 | 8.9 | 8.8 |
| 6 | 77.5 | 83.1 | 8.8 | 9.2 |
| 7 | 73.6 | 77.6 | 7.6 | 8.8 |
| 8 | 74.1 | 77.9 | 8.7 | 10.3 |

COMPARATIVE EXAMPLE A

Example I is repeated on stalks 18.8 months of age with 0.3 ml/stalk deposits (30 pounds/acre) of formic, propionic and stearic acids (the latter only being applied at a rate of 38 mg/stalk, which corresponds to about 4 pounds/acre). The following results are obtained:

|  | Time From Treatment To Harvest | | | |
| --- | --- | --- | --- | --- |
|  | Four Weeks | | Five Weeks | |
|  | Juice Purity | Pol Percent Cane | Juice Purity | Pol Percent Cane |
| Control (untreated) | 77.17 | 8.96 | 74.77 | 7.77 |
| Standard (Trysben) | 80.81 | 9.85 | 82.93 | 10.31 |
| Methanoic (Formic) | 79.13 | 9.57 | 83.90 | 12.77 |
| Octadecanoic (Stearic) | 60.48 | 5.45 | 75.74 | 7.96 |

COMPARATIVE EXAMPLE B

Example I is repeated on stalks 19.3 months of age with 0.3 ml/stalk deposits (30 pounds/acre) of n-butyric acid and n-caproic acid and with 38 mg/stalk (4 pounds/acre) of capric and hendecanoic acids. A comparative treatment with Trysben is also made. The following results are obtained:

|  | Time From Treatment To Harvest | | | |
|---|---|---|---|---|
|  | Four Weeks | | Five Weeks | |
|  | Juice Purity | Pol % Cane | Juice Purity | Pol % Cane |
| Control (untreated) | 68.89 | 6.99 | 72.30 | 8.14 |
| Standard (Trysben) | 72.69 | 7.43 | 75.52 | 8.96 |
| Butanoic (n-Butyric) | 80.96 | 10.85 | 74.84 | 8.98 |
| Hexanoic (n-Caproic) | 56.72 | 4.90 | 70.45 | 7.72 |
| Decanoic (Capric) | 68.08 | 6.81 | 68.68 | 7.56 |
| Undecanoic (Hendecanoic) | 73.49 | 7.80 | 70.85 | 7.74 |

COMPARATIVE EXAMPLE C

The procedure of Example I is repeated on stalks 20.2 months old using 0.38 mg/stalk deposits (about 4 pounds/acre) of n-pentadecanoic and eicosanoic acids. The following results are obtained:

|  | Time From Treatment To Harvest | | | |
|---|---|---|---|---|
|  | Four Weeks | | Five Weeks | |
|  | Juice Purity | Pol Percent Cane | Juice Purity | Pol Percent Cane |
| n-Pentadecanoic | 74.06 | 7.57 | 79.63 | 9.63 |
| Eicosanoic (Arachidic) | 73.94 | 7.91 | 74.90 | 7.80 |
| Trysben (standard) | 83.43 | 11.02 | 81.12 | 9.73 |
| Control (untreated) | 78.19 | 9.50 | 79.24 | 9.76 |

COMPARATIVE EXAMPLE D

The procedure of Example I is repeated on three separate occasions on aged sugarcane stalks using 0.3 mg/stalk deposits of propionic acid. On two of these occasions, juice purity and pol percent cane values obtained at both four and 5 weeks treatment time prior to harvest are lower than the control (untreated) stalks. On one occasion, however, the obtained values are greater than those obtained from the control sample.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A process for increasing the sugar yield of grown sugarcane which comprises applying an effective amount of a sugar-cane ripening agent taken from the group consisting of n-valeric acid and sodium salts or ethyl esters of alkanoic monoacids having 1 to 5 carbon atoms to the cane at a time at least about 2 and up to about 10 weeks prior to harvest.

2. The process of claim 1 wherein the sugarcane ripening agent is n-valeric acid.

3. A process according to claim 1 wherein said sugarcane ripening agent is applied to the cane at a rate corresponding to from about 1 to about 80 pounds per acre.

4. A process according to claim 1 wherein the compound is applied to the cane at a time of between about 3 and about 8 weeks before harvest.

5. A process according to claim 3 wherein said sugarcane ripening agent is applied to the cane at a rate corresponding to from about 1 to about 40 pounds per acre.

6. A process according to claim 1 wherein the sugarcane ripening agent is applied to the cane at a rate of from 1 to about 40 pounds per acre and at a time of between about 3 and about 8 weeks before harvest.

7. The process of claim 1 which comprises applying the sodium salt or ethyl ester of an alkanoic monoacid having from 1 to 5 carbon atoms as the sugarcane ripening agent.

8. A process according to claim 6 wherein said aliphatic monoacid is n-valeric acid.

9. A process according to claim 6 wherein said sugarcane ripening agent is the ethyl ester of valeric acid.

10. The process of claim 6 wherein said sugarcane ripening agent is the sodium salt of valeric acid.

* * * * *